United States Patent Office 3,113,095
Patented Dec. 3, 1963

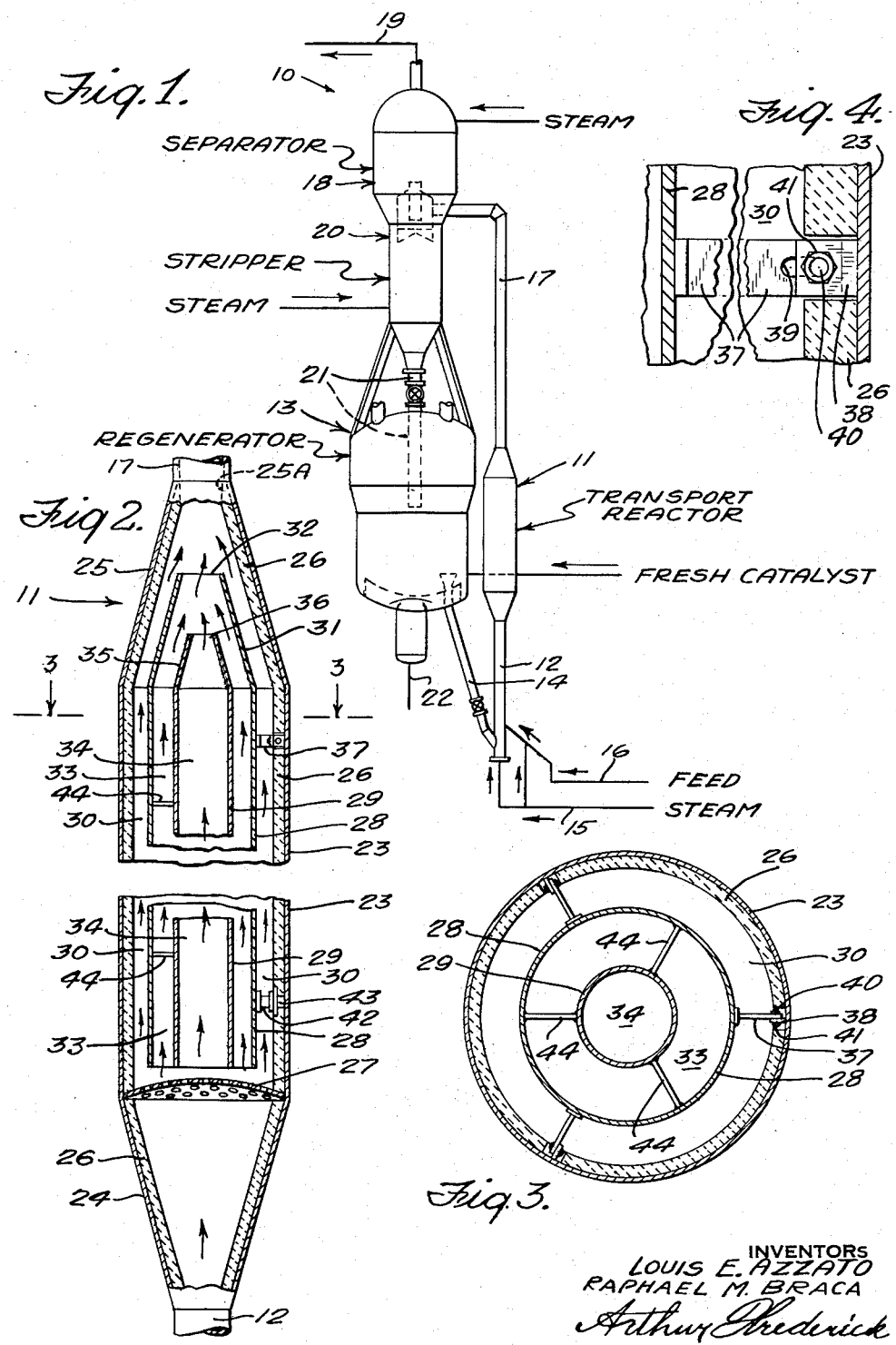

3,113,095
TRANSPORT REACTORS
Raphael M. Braca, 1426 Via Nomentana, Rome, Italy, and Louis E. Azzato, 107—22 77th St., Ozone Park, N.Y.
Filed May 17, 1960, Ser. No. 29,727
4 Claims. (Cl. 208—153)

This invention relates to fluidized catalyst reactors for the conversion of a suitably prepared hydrocarbon feed stock in the presence of a finely divided catalyst to produce lower boiling point constituents of the hydrocarbon feed stock. More particularly, the present invention relates to an improvement in fluid catalyst reactors of the type disposed in a transfer line and commonly referred to as "transport" reactors. Transport reactors are characterized and distinguished from fluidized bed reactors in that the transport reactor is adapted to receive and flow a mixture of hydrocarbon feed stock vapors, steam and finely divided catalyst axially through the reactors in a once through manner.

In fluidized conversion processes employing one or more transport reactors in which the stream of hydrocarbon vapor, steam and finely divided catalyst flows upwardly through the reactors, it has been found that the velocity of the stream adjacent the reactor walls is less than the velocity of that portion of the stream flowing through the central portion of the reactor so that the stream flowing through the reactor has a high velocity central zone and a low velocity peripheral zone. Where the velocity of the stream of hydrocarbon vapor steam and finely divided catalyst at the inlet of the reactor is relatively low, the velocity of the stream in the low velocity peripheral zone is not sufficient to cause all of the catalyst particles to pass directly from the reactor so that at least some of the catalyst particles in the high velocity zone immediately adjacent the low velocity peripheral zone cascade downwardly in the peripheral zone and are lifted in the central high velocity zone, thereby creating a condition of catalyst recirculation or back-mixing within the reactor. The catalyst particles in flowing through the reactors become coated with a carbonaceous deposit which renders the particles inactive as a catalytic agent in the cracking reaction and is referred to as used or spent catalyst. The back-mixing of catalyst within the reactors is therefore undesirable since it results in subsequent hydrocarbon feed vapors coming in contact with spent catalyst particles which, in turn, results in incomplete cracking and a decrease in product yield. Furthermore, back-mixing increases the attrition of the catalyst particles and the walls of the reactor due to the increased abrasive action of the catalyst particles against each other and against the reactor walls thereby reducing the operative life of the reactors and the catalyst charge. It is clear that the back-mixing of catalyst particles in an upflow transport reactor becomes more severe as the entering velocity of the stream decreases. This factor has imposed in the design of catalytic conversion processes employing upflow transport reactors a minimum acceptable velocity of the stream of catalyst and vapors entering the reactor.

Accordingly, it is one of the objects of the present invention to provide an improved upflow transport reactor whereby substantially complete cracking of the hydrocarbon vapor may be achieved with lower stream velocities than is possible with presently known transport reactors. Another object of this invention is to provide a transport reactor wherein back-mixing of catalyst particles is substantially minimized, if not entirely obviated. It is also an object of the present invention to provide a transport reactor having greater operative life, as well as providing greater operative life of the catalyst charge, than present transport reactors by reducing attrition of the catalyst particles and erosion of reactor walls.

It is to be understood that the term reactant stream as hereinafter used shall refer to a stream comprising a mixture of hydrocarbon feed vapors, steam and finely divided catalyst.

It is therefore contemplated by this invention to provide a novel upflow transport reactor in which the interior is divided into a plurality of passageways by suitable baffling to divide the reactant flowing through the reactor into a plurality of smaller reactant streams. The baffling is constructed and arranged to provide a constricted outlet for each of said passageways for increasing the velocity of the stream flowing through the outlets and thereby preventing back-mixing of catalyst particles. The baffling is also arranged so that the increased velocity of an inner stream has an inspirating effect upon the next adjacent outer stream and obviates back-mixing of catalyst particles in the outer stream.

This invention will be more fully understood from the following description when considered in connection with the accompanying drawings, in which:

FIG. 1 is a view in elevation of a hydrocarbon catalyst conversion process employing an upflow transport reactor according to this invention;

FIG. 2 is a longitudinal, central section through the upflow transport reactor of the present invention;

FIG. 3 is a transverse sectional view taken substantially along line 3—3 of FIG. 2 somewhat enlarged; and FIG. 4 is a fragmentary view on an enlarged scale showing the means for supporting the baffle structure within the reactor.

Now referring to the drawings, and more particularly to FIG. 1, 10 generally designates a hydrocarbon catalyst process apparatus employing an upflow transport reactor 11, somewhat diagrammatically shown. Transport reactor 11 is connected at its lower end to the end of a pipe 12. The lower end of pipe 12 is connected to receive regenerated catalyst from a regenerator 13 through a downflow line 14. Steam is delivered from a suitable source thereof, not shown, to the lower end of pipe 12 through a steam feed line 15. A hydrocarbon feed stock vapor which is to be cracked is delivered to the lower end of pipe 12 by a hydrocarbon feed line 16. The subdivided catalyst delivered through line 14 to pipe 12 is entrained by the hydrocarbon vapor and steam, and this reactant stream of catalyst and vapors passes upwardly into the lower end of transport reactor 11. In transport reactor 11 the hydrocarbon vapor is converted to its lower boiling point constitutes and carbonaceous material is deposited upon the catalyst particles. The resultant product stream of lower boiling point vapors and used or spent catalyst particles passes upwardly into a catalyst separator 18 through a pipe 17 which is connected to the upper end of transport reactor 11. In separator 18, the product gas is separated from the spent catalyst particles, with the product gas passing out of the top of the separator 18 by way of a product line 19 to suitable fractionating and recovery equipment, not shown. The separated spent catalyst then passes downwardly into a steam stripper 20. The spent catalyst passes by gravity flow from steam stripper 20 into regenerator 13 by way of a stand pipe 21. In regenerator 13, the spent catalyst particles flow in concurrent relationship with air delivered into the bottom of regenerator 13 by a line 22. In regenerator 13, the carbonaceous deposits on the catalyst particles are burned off, and the regenerated catalyst then flows from regenerator 13, through line 14, to pipe 12 to effect cracking of further quantities of hydrocarbon vapors.

As best shown in FIGS. 2 and 3 the improved transport reactor 11 employed in the hydrocarbon conversion process, above described, comprises a central cylindrical section 23, a lower inverted frusto-conical section 24, and an upper frusto-conical section 25. The inner surfaces of sections 23, 24 and 25 may be lined with heat insulating refractory material 26. The lower section 24 of reactor 11 is connected to pipe 12 to receive from the latter the stream of hydrocarbon vapor, steam and catalyst particles, while the upper section 25 of reactor 11 is connected to pipe 17 to pass the product fluid stream containing lower boiling point constituents of the hydrocarbon feed and spent catalyst. At the juncture of lower section 24 and central section 23 of reactor 11, a perforated plate or grid 27, is disposed across the flow area of the reactor which grid distributes the incoming reactant stream somewhat uniformly across the flow area of central section 23.

In the embodiment of the invention illustrated, two spaced open ended cylindrical baffles 28 and 29 are arranged within transport reactor 11. Baffle 28 extends, from a point in relatively close spaced relationship with distribution grid 27, upwardly in spaced relationship to the inner surface of central section 23 to define with the latter an annular passageway 30. The upper end of baffle 28 is provided with a frusto-conical portion 31, the taper or slope of which is complementary to the taper of upper section 26 of reactor 11. By reason of the frusto-conical portion 31, a constricted outlet 32 is provided, the purpose and function of which will be hereinafter fully described. Baffle 29, which is of smaller diameter than baffle 28, is arranged concentrically within baffle 28 and is coextensive with the latter to define with baffle 28 a second annular passageway 33. Baffle 29 also forms a central passageway 34. The upper end of baffle 29 is formed with a frustoconical shaped end portion 35, the taper or slope of which is complementary to the taper or slope of frustoconical portion 31 of baffle 28. Frusto-conical shaped end portion 35 forms a constricted outlet 36, similar to constricted outlet 32. As shown, the frusto-conical shaped end portion 35 of baffle 29 is of smaller dimensions than frusto-conical portion 31 of baffle 28 so that outlet 36 is spaced upstream from outlet 32.

As best shown in FIGS. 3 and 4, the aforedescribed baffle assembly is supported within the transport reactor 11 and in spaced relationship with the walls of the reactor, by a plurality of circumferentially spaced arms 37. For illustration purposes only three arms 37 are shown in FIG. 3, since more than three means for supporting the baffle assembly may be necessary for a particular transport reactor design. Each of the arms 37 are suitably secured at one end, as by welding, to baffle 28 while the opposite end of each of the arms 37 is slidably connected to a lug 38, which lugs are secured, as by welding, to the wall of the central section 23 of the reactor 11. As shown in FIG. 4, each of the arms 37 is provided with an elongated opening 39 which registers with an opening (not shown) in the adjacent lug 38. A threaded bolt 40 extends through the opening in lug 38 and the elongated opening 39 in arm 37, and a nut 41 (FIG. 3) is turned upon bolt 40 sufficiently tight to prevent lateral movement between arm 37 and the lug 38 associated therewith, but not tight enough to prevent lengthwise movement of arm 37 relative to lug 38. By providing for relative movement between arms 37 and lug 38, radial expansion or contraction of baffle 28 with respect to central section 23 of transport reactor 11 is allowed.

Lateral movement of the unsupported lower portion of baffle 28 is prevented and baffle 28 is maintained in proper spaced relationship with the inner surface of the central section 23 of reactor 11 by a plurality of circumferential spaced "I"-shaped spacer members 42 (only one of which is shown in FIG. 2) which are secured adjacent the lower end portion of baffle 28. Spacer members 42 extend radially from baffle 28 toward the wall of central section 23. A T-shaped contact member 43 (only one of which is shown in FIG. 2) is secured to the wall of central section 23 in radial alignment with each spacer member 42. Each T-shaped contact member 43 is disposed horizontally and is secured to the wall of central section 23. The length of each spacer members 42 is such that upon thermal radial expansion of baffle 28 and linear expansion of spacer members 42, each of the spacer members 42 lightly contacts its associated contact member 43 without binding thereagainst and interfering with the free downward linear movement of baffle 28 relative to reactor 11.

Two sets of three circumferentially spaced rods 44 are provided to secure baffle 29 to baffle 28 so that baffle 29 is supported by baffle 28. Rods 44 also maintain baffle 29 in proper concentric spaced relationship with baffle 28. While three spaced rods 44 are shown and illustrated in FIG. 3, it is contemplated that two or more than three rods 44 may be used without departing from the scope and spirit of this invention.

The aforedescribed support structure provides, when the transport reactor 11 is subjected to relatively high operating temperatures, for differential radial expansion between baffle 28 and the walls of the transport reactor by the relative movement of arms 37 and lugs 38, which relative movement is allowed by movement of elongated openings 39 of arms 37 relative to bolts 40. Since baffles 28 and 29 are supported adjacent the upper end only and are spaced from grid 27, baffles 28 and 29 are free to expand linearly downwardly relative to reactor 11. Lateral movement and proper concentricity of baffle 28 with respect to reactor 11 is maintained by the cooperative action of each pair of spacer member 42 and contact member 43.

In the operation of the aforedescribed transport reactor according to this invention, the incoming stream of hydrocarbon vapor, steam and catalyst particles flows from pipe 12 into the bottom of the lower frusto-conical section 24 of reactor 11 and thence upwardly to perforated distribution grid 27. In passing through the perforations of the distribution grid 27, the reactant stream is distributed somewhat uniformly across the flow area of central section 23 of the reactor 11. Above distribution grid 27, the reactant stream is divided by baffles 28 and 29 into three smaller streams, an annular stream flowing upwardly through annular passageway 30, a second annular stream flowing upwardly through passageway 33, and a central stream flowing through baffle 29. The central reactant stream in passing upwardly through constricted opening 36 has its velocity increased which has the two-fold effect of (1) preventing catalyst particles from cascading downwardly into passageway 33 and (2) creating a low pressure zone adjacent the upper end of passageway 33 to inspirate the stream flowing upwardly through passageway 33 so that the velocity of the latter stream is increased. With an increase in the velocity of the stream in passageway 33, back-mixing of the catalyst particles in the stream flowing through passageway 33 is prevented. The reactant streams from central passageway 34 and passageway 33, combine above constricted outlet 36 and flow through constricted outlet 32 which is formed by baffle 28. The combined reactant stream in passing through constricted outlet 36 has its velocity increased which has the two fold effect of (1) preventing catalyst particles from cascading downwardly into passageway 30 and (2) producing a low pressure zone adjacent the upper end of passageway 30 whereby an inspirating effect upon the annular stream flowing through passageway 30 is achieved and the velocity of the stream flowing through passageway 30 is increased. By increasing the velocity flow of the stream flowing through passageway 30, a back-mixing of the catalyst particles in that stream is eliminated. The reactant stream from passageway 30 combines with the two other smaller combined streams flowing through constricted opening 36 above baffle 26 and flows out of reactor 11 into pipe 17. The frustoconical shape of upper section 25 of reactor 11 serves to form a constricted outlet 25A for reactor 11 which constricted outlet increases the velocity of the reactant stream flowing from the reactor and thus prevents the downward cascading of catalyst particles.

The invention, as now can be fully understood from the foregoing description, provides an improved transport reactor wherein back-mixing of catalyst particles has been obviated, thereby increasing the operative life of the reactor itself as well as the catalyst charge by reducing attrition of the catalyst particles and erosion on the walls of the reactor. Furthermore, the transport reactor permits the design of hydrocarbon conversion equipment for lower reactant stream velocities than was heretofore possible.

While the transport reactor of this invention has been described as applied to the cracking of hydrocarbons, it has application to other processes utilizing finely divided catalyst flowing in admixture with a reactant stream. Furthermore, it is contemplated that the reactor may be provided with one or more than two internal baffles without departing from the scope and spirit of this invention, the number of baffles being dependent upon the size of the catalyst particles and the incoming velocity of the reactant stream.

Although but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art.

What is claimed is:

1. An upflow catalyst reactor comprising a vertically disposed vessel having a cylindrical middle section, an integral upper frusto-conical end section and an integral lower inlet end section; means in fluid communication with the lower of said end sections adapted to feed to said end section a reactant stream containing a finely divided catalyst and including means by which said catalyst is entrained in said stream, said upper frusto-conical section having an outlet for discharging the product fluid stream from said vessel; means in said vessel including at least one baffle disposed within the vessel comprising an open-ended cylindrical portion extending substantially the length of the cylindrical middle section of said vessel and in spaced relation therewith and an upper frusto-conical end portion extending in spaced relationship with the vessel upper end section, said baffle being supported within said vessel to divide the interior flow area of the vessel into at least one outer annular passageway and an inner middle passageway each of which communicates at the bottom with the inlet of the vessel to receive said reactant fluid including said finely divided catalyst and at the top with the outlet of the vessel and with each other, said frusto-conical end portion of said baffle being arranged to act on the reactant fluid stream flowing in the middle passageway to increase the velocity of the stream therein at its point of merger with the stream flowing in the outer passageway thereby inspirating the latter and preventing back-mixing of entrained catalyst particles.

2. An upflow catalyst reactor comprising a vertically disposed vessel forming a reaction chamber and having a cylindrical middle section and integral opposite upper outlet and lower inlet frusto-conical end sections; means in fluid communication with the lower of said end sections adapted to feed to said end section a reactant stream containing a finely divided catalyst and including means by which said catalyst is entrained in said stream, said upper frusto-conical section having an outlet for discharging the product fluid stream from said vessel; means in said vessel for reducing variance of reaction time in the vessel including a plurality of baffles in concentric spaced apart relationship with each other and with said cylindrical middle section and spaced from the inlet and outlet of the vessel, each baffle comprising an open-ended cylindrical portion extending substantially the length of the cylindrical middle section of said vessel and an upper frusto-conical end portion extending in concentric spaced relationship with the vessel upper end section, said baffles being supported within said vessel to define a central passageway and a plurality of annular concentric passageways which communicate at the bottom with the inlet of the vessel to receive said reactant fluid including said finely divided catalyst and at the top of the vessel with the outlet of the vessel and with each other, said baffles further being arranged so that the constricted outlet opening of an inner baffle is spaced upstream of the constricted outlet opening of a next outer baffle and is effective to increase the velocity of the reactant fluid flowing within the inner baffle and through said outlet opening inspirating and mixing with the reactant fluid flowing through the outer baffle and annular passageway, thereby preventing back-mixing of entrained catalyst particles.

3. The apparatus of claim 2 wherein means is provided for supporting the pair of baffles within the vessel and allowing radial and linear differential expansion between the baffles and the vessel.

4. In a process for carrying out a catalytic reaction with an upflowing reactant stream containing a hydrocarbon vapor and finely divided catalyst particles, the steps comprising dividing the reactant stream somewhat uniformly across its flow area into a plurality of adjacent parallel smaller streams, conducting the smaller streams upwardly and separately so that an inner stream in embraced by an outer stream, and subsequently merging said streams, the improvement comprising increasing the velocity of an inner smaller stream at the point of merging it with the next adjacent outer stream to inspirate the latter and thereby prevent back-mixing of entrained catalyst particles.

References Cited in the file of this patent

UNITED STATES PATENTS

| | | |
|---|---|---|
| 1,850,398 | Jaeger | Mar. 22, 1932 |
| 2,359,310 | Hemminger | Oct. 3, 1944 |
| 2,500,516 | Carpenter | Mar. 14, 1950 |
| 2,831,548 | Barkelew | Apr. 22, 1958 |
| 2,947,600 | Clayton | Aug. 2, 1960 |